(No Model.)
E. ROTH.
BLIND RAISED OR LOWERED BY MEANS OF ELECTRICITY AND SOLAR RAYS.
No. 595,343.          Patented Dec. 14, 1897.
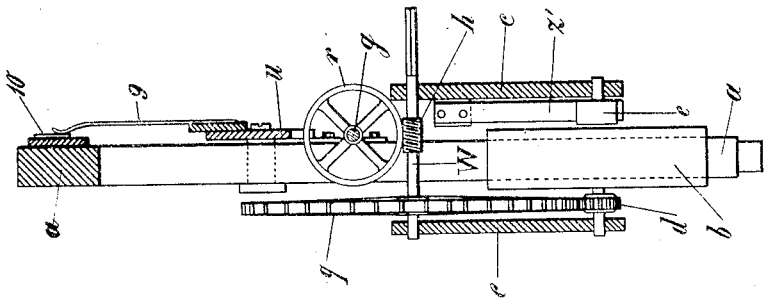
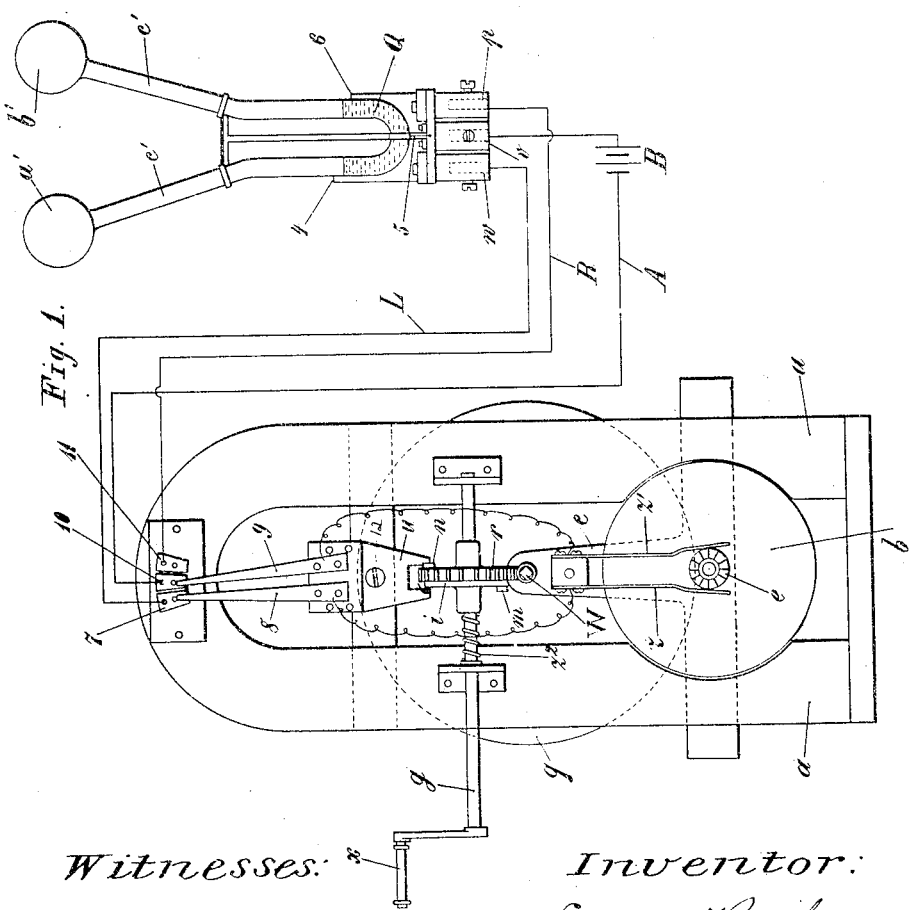
Witnesses:
E. P. Bolton
O. H. Williams
Inventor:
Eugen Roth
By Renard & R.
his Attorneys

UNITED STATES PATENT OFFICE.

EUGEN ROTH, OF OSNABRÜCK, GERMANY.

BLIND RAISED OR LOWERED BY MEANS OF ELECTRICITY AND SOLAR RAYS.

SPECIFICATION forming part of Letters Patent No. 595,343, dated December 14, 1897.

Application filed December 5, 1896. Serial No. 614,646. (No model.)

*To all whom it may concern:*

Be it known that I, EUGEN ROTH, a subject of the King of Prussia, residing at Osnabrück, Kingdom of Prussia, German Empire, have invented certain new and useful Improvements in Shades and the Like Raised and Lowered by Means of Electricity and the Solar Rays, of which the following is a specification.

The subject of the present invention is an apparatus having the purpose to perform the raising and lowering of shades automatically. This is done by an electromotor and two transparent hollow bodies exposed to the rays of the sun. One of the bodies has a black coating or is preferably partly filled with black cotton, wool, &c., in order to have its contained air heated by the rays of the sun, whereas these rays penetrate the other transparent globe without heating to the same degree the contained air. Both hollow globes are therefore exposed to the sun.

In the accompanying drawings, showing this invention, Figure 1 is a front view; Fig. 2, a vertical cross-section in the line $x\,x$.

Between the arms of a steel magnet $a$ is an armature $b$, revoluble in bearings $c$. This armature carries on its shaft a small driving-pulley $d$ and a commutator $e$, and the latter is engaged by two conducting-brushes $z\,z'$. In the pillow-block $c$ is also the shaft W, having its front end squared. On this square rests the curtain-rod. On the opposite end of the shaft W is the cogged wheel $q$, which is acted upon by the small driving-wheel $d$. On the steel magnet and at right angles to the aforesaid shafts is still another shaft $g$, carrying a loose spiral wheel $r$, which is engaged by the worm $h$ and has a disk $i$. The latter is fixed to the shaft $g$ and pressed against the loose spiral wheel $r$ by means of a spiral spring $z^2$. This spiral wheel $r$ and the disk $i$ have stubs $m$ and $n$, which may be adjusted by turning the crank $x$ in order to cut off the electric current and thereby raise or lower the shade. The disk $i$ and the contact-wheel $r$ rotate between the two ends of a forked contact-lever $u$, which latter may be pushed to the right or left by the stubs $m$ and $n$, thereby swinging around the screw 12 and connecting or cutting off the current to the electromotor by means of the springs 8 and 9, sliding, respectively, on the contacts 7, 10, and 11.

On the outside of the window, therefore, exposed to the direct rays of the sun, are two transparent hollow globes $a'\,b'$. One of these globes $a'$ has a black coating, or may preferably be partly filled with a dark material, as black cotton, wool, &c. The object of this is to heat the air in the dark globe by the sun-rays, whereas these rays penetrate the other transparent globe $b'$ and do not heat the air within. These globes $a'$ and $b'$ are on the ends of a horseshoe-shaped glass tube $c'$. In this tube $c'$ are sealed three wires 4, 5, and 6. A mercury column Q in said tube $c'$ will come in contact with the wire 4 or 6, according to the expansion of the air in the globes $a'$ and $b'$, and therefore cut off or close the current.

In the accompanying drawings the apparatus is shown at a time of rest, therefore not being exposed to the sun-rays.

If now both globes are exposed to the sun, the air in the dark globe will expand according to aforesaid reasons. The expanded air presses upon the mercury column Q, connects the same with wire, and thereby closes the current. The electric current takes now the following way: From the battery B it runs to the terminal $v$, then through the wire 5 and the mercury column Q to the wire 4, from there to the terminal $w$, through the wire L to the terminal 7 and the contact-spring 8, from there to the sliding brush $z$, to the motor, to the brush $z'$, the contact-spring 9, the terminal 10, and through the wire A back to the battery B. The motor runs now with considerable speed—for instance, to the right—so long until the stub $m$ of the disk $i$ pushes the lever $u$ to the left, whereby the contact is established between the contact-spring 8 and the terminal 10 and between the contact-spring 9 and the terminal 11 and thereby the circuit interrupted. The circuit for the shadow is now closed, but for the sun is open.

If now the two globes are not any more exposed to the sun-rays, the air in the dark globe $b'$ will by and by have the same tension as the air in the transparent globe $a'$, the mercury column will have its normal position, and the circuit for the shadow will be closed. The electric current takes now the following way: From the battery B it runs to the terminal $v$, then through the wire 5 and the mercury column Q to the wire 6, from there to the terminal $p$, through the wire R to the terminal 11 and the contact-spring 9, through the sliding brush $z'$ to the motor, to the brush $z$, the contact-spring 8, the terminal 10, and the wire A back to the battery B. The current runs hereby in an opposite direction through the wires and the motor. The motor now rotates to the left and winds the shade up until the stub $n$ pushes the contact-lever $u$ to the right, whereby the contact-springs 8 and 9 slide on the terminals 7 and 10 and the circuit is interrupted. The circuit for the sun is now closed, but is open for the shadow. This whole action is now repeated as soon as the globes are exposed to the sun-rays or as the latter disappear. The temperature may be high or low. Even the wind has no influence, as the heat of the sun-rays acts only within the globes. The contact for the sun may have its place taken by an automatic switchboard, whereby the shade may be lowered or raised by means of the electric current.

I claim—

1. In combination with a shade-roller or the like, the motor for operating the same, the sunshine-operated circuit-closer comprising the U-shaped tube containing a circuit-closing fluid, the three switch-plates, the circuit-wires extending from said switch-plates to the circuit-closer, and adapted to form two circuits, the switch having electrical connection with the motor and having two arms adapted to contact with two of the switch-plates, and means for automatically shifting said switch at the limit of the movement of the shade-roller in either direction to reverse the polarity of the armature and field with relation to each other, substantially as described.

2. In combination, the magnet and armature, the driving-shaft operated from said armature, the second shaft operated from said driving-shaft, the switch-shifting device carried by said second shaft, the two-armed switch-piece operated by said shifting device to reverse the polarity of the armature and field with relation to each other, and having electric connections to the armature, the three switch-plates, the sunshine-operated circuit-closer, and the electric connections from the switch-plates to said circuit-closer, substantially as described.

3. In combination, the magnet and armature, the driving-shaft operated from said armature and adapted to be connected to a shade-roller, the second shaft arranged at right angles to the driving-shaft, and the worm on the driving-shaft engaging a worm-wheel on the second shaft, the switch-shifting device carried by said second shaft, the switch operated thereby to reverse the polarity of the armature and field with relation to each other, the switch-plates, the sunshine-operated circuit-closer, and the electric connections from the circuit-closer to the switch-plates, substantially as described.

In witness whereof I have hereunto set my hand in presence of two witnesses.

EUG. ROTH.

Witnesses:
KARL HARTMANN,
CHARLES H. DAY.